United States Patent [19]
Beymer

[11] Patent Number: 5,424,726
[45] Date of Patent: Jun. 13, 1995

[54] METHOD, APPARATUS AND SYSTEM FOR TRANSMITTING AND RECEIVING DATA IN A MOVING LINEAR CHAIN

[75] Inventor: Bryan A. Beymer, Seattle, Wash.

[73] Assignee: Intrass Company, Seattle, Wash.

[21] Appl. No.: 954,791

[22] Filed: Sep. 30, 1992

[51] Int. Cl.⁶ .................................................. G08B 1/00
[52] U.S. Cl. ..................................... 340/902; 340/903;
340/901; 340/905; 340/932; 180/167
[58] Field of Search ......................... 340/901–905,
340/435, 436, 932, 441, 471, 425.1;
180/167–171, 271

[56] References Cited

U.S. PATENT DOCUMENTS

| | | | |
|---|---|---|---|
| 3,192,437 | 6/1965 | Meyer | 340/903 |
| 3,235,025 | 2/1966 | Quinn | 340/903 |
| 3,293,600 | 12/1966 | Gifft | 340/903 |
| 3,892,483 | 1/1975 | Saufferer | 340/903 |
| 4,621,705 | 11/1986 | Etoh | 340/903 |
| 4,622,636 | 11/1986 | Tachibana | 340/904 |
| 4,694,296 | 9/1987 | Sasaki | 340/904 |
| 4,706,086 | 11/1987 | Panizza | 340/902 |
| 4,794,394 | 12/1988 | Halstead | 340/902 |
| 4,833,469 | 5/1989 | David | 340/901 |
| 4,934,477 | 6/1990 | Dai | 340/436 |
| 5,091,726 | 2/1992 | Shyu | 340/904 |

FOREIGN PATENT DOCUMENTS 4241100  8/1992  Japan ............................ 340/903

Primary Examiner—Donnie L. Crosland
Attorney, Agent, or Firm—Stephen M. Evans; David L. Garrison

[57] ABSTRACT

A method, apparatus, and system for transmitting and receiving an electromagnetic data signal in a moving, linear chain. Each unit in a chain of units has a processing unit interconnecting a directional receiving element, a directional low power transmitting element, a deceleration detector for the unit, and a deceleration detector for preceding units in the chain. In a simple form, motor vehicles are the units. If the invention detects deceleration of a preceding vehicle, deceleration of itself, or an identifiable signal from a preceding vehicle such as a blue light, it causes a rearward facing blue light to illuminate. This blue light indicates to following motorists that the perceived vehicle is decelerating or that a vehicle somewhere in front from of it is decelerating. The blue light also may be received by another vehicle equipped with the invention and consequently be transmitted rearwardly. In a general form, a data encoded high frequency signal is transmitted rearwardly from a vehicle. This signal contains information relating to deceleration of any preceding vehicles (Chain Brake) and of the transmitting vehicle (Brake). A receiving vehicle analyzes and displays this data to provide a motorist with information regarding preceding vehicles that may or may not be seen by the motorist. In a complex form, a variety of data is transmitted and received bi-directionally throughout the chain.

32 Claims, 4 Drawing Sheets

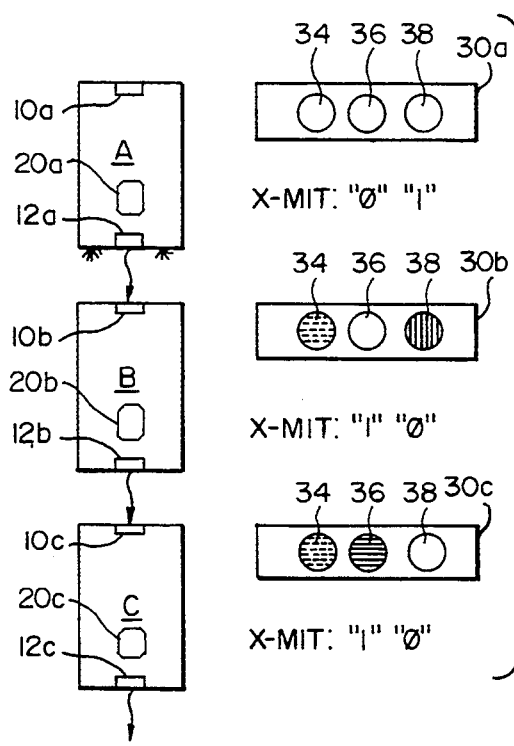
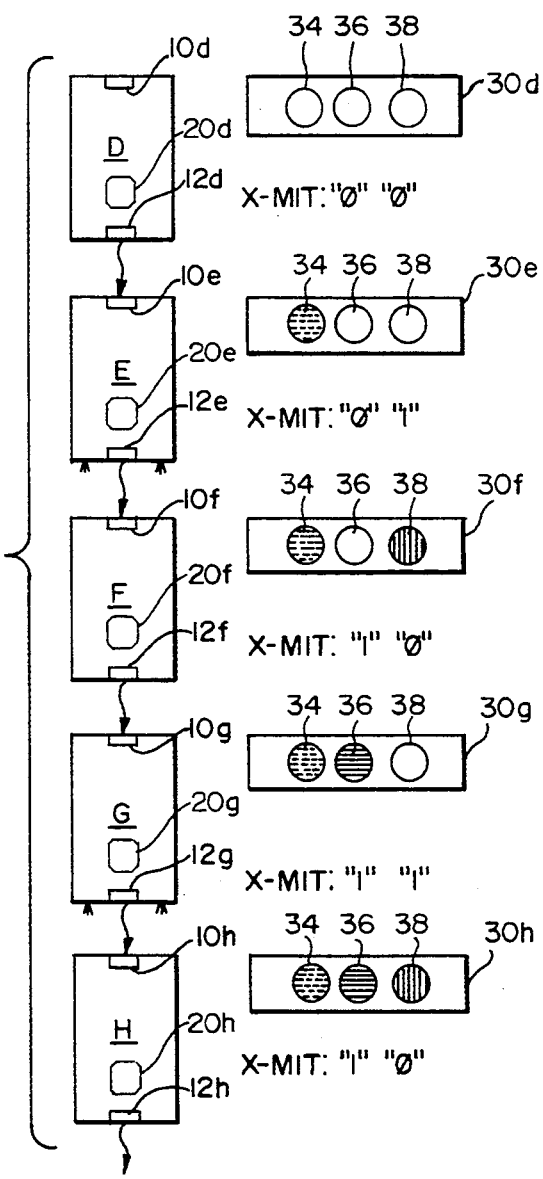

METHOD, APPARATUS AND SYSTEM FOR TRANSMITTING AND RECEIVING DATA IN A MOVING LINEAR CHAIN

FIELD OF THE INVENTION

The present invention relates to an information transmission and reception system, modeled on a linear chain, for use primarily in collision avoidance. In a linear chain utilizing the invention, a data signal is sent from a first and forward most unit through the chain to a last unit. The information sent from the first unit is transmitted rearwardly by each subsequent unit in the chain wherein each unit may interpret and modify the signal being sent. At any point in the chain, a unit may analyze the transmitted signal to obtain information about conditions forward of that unit. Appropriate actions may then be taken by an operator of any unit.

BACKGROUND OF THE INVENTION

Many devices have been proposed to assist the motorist of a vehicle in avoiding collisions. One area of the art can be considered proximity detectors which rely on the amplitude of a received signal to indicate that a certain minimum distance has been established. These devices require that the lead automobile and the following automobile possess the same equipment. These devices generally utilize an auxiliary emitter and receiver to indicate the relative distance between a lead automobile and a following automobile. Devices of this nature rely on amplitude of the transmitted waves to trigger a warning system on a following automobile. For example, a lead car emits light waves and when a following car encounters these waves, an alarm is triggered to indicate to the following motorist that she or he is in close proximity to the lead car. A representative patent in this field is U.S Pat. No. 3,892,483 issued to Saufferer on Jul. 1, 1975. Saufferer discloses a distance warning device for vehicles. His invention concerns the rearward transmission of waves so that a following vehicle would receive the waves and either indicate that the following vehicle was too close, or automatically brake the following vehicle to avoid a collision. Saufferer relies on wave detection or monitoring of wave amplitude as the means for determining distance between the two vehicles.

Another area of the art can be considered distance measuring devices that rely on the Doppler effect. These devices are autonomous—they do not require that another vehicle have a compatible system. These devices generally utilize a wave emitting and receiving component located on the primary vehicle. By emitting wave energy and analyzing the reflected wave, an approximation as to distance between the primary vehicle and another object can be determined. When a certain minimum value corresponding to a minimum safe distance is reached, the motorist of the primary vehicle is alerted or his or her vehicle is caused to slow in response thereto. A representative patent in this field is U.S. Pat. No. 4,833,469 issued to David on May 23, 1989. David discloses a proximity sensing system that uses the Doppler principal to warn a motorist of a vehicle that he or she is approaching an object at an unsafe speed. This is accomplished by comparing the relative speeds of the vehicle to the measured object.

Both of these systems, the proximity detectors and the distance/velocity devices using the Doppler principal, look only to the vehicle directly in front of or behind the motorist. These systems are designed to warn a motorist that an unsafe condition may exist, based upon distance considerations. These systems are reactive and not proactive i.e., these systems warn a motorist only after a hazardous situation has been encountered.

Under many circumstances, knowledge of the condition of a vehicle directly in front of a motorist is adequate. That, of course, is the purpose of brake lights and turn signals. However, as the nations' highways become more and more congested, more and more "chains" are formed. These chains, a term used from the common phrase "chain reaction", occur when a linear progression of vehicles closely follow one another. It is in these situations that accidents are very likely to occur—especially when driving conditions are poor such as during a snow storm or in dense fog. For example, from 1981 to 1989 783 people died on California highways because of fog related accidents. Clearly, many of these accidents could have been avoided if each motorist in the chain of vehicles knew of the preceding vehicle's actions without relying upon significantly impaired, external visual cues.

Often, a motorist immediately observing the brake lights of a preceding vehicle does not realize his or her minimum stopping distance may be greater than that of the preceding vehicle. Or even more common, a preceding vehicle can see a hazardous condition and be prepared to respond; however, those motorists following this vehicle are shielded from that critical information and must only rely on the brake lights of the preceding vehicle to inform them of forth coming adverse conditions. This problem is best exemplified where a tractor and trailer truck obstructs a motorist's view of conditions in front of the truck. For example, if the brakes of a vehicle in front of the truck are applied, the motorist following the truck must wait for the truck to apply its brakes, change lanes, or otherwise become aware of the condition that requires braking or avoidance.

In chains, the delay from motorist to motorist in responding to brake lights of the vehicle in front of him or her becomes significant. On the average, it takes 0.25 seconds for the human brain to observe and analyze a condition, and an additional 0.25 seconds for a corresponding reaction to the observation to occur. Consequently, each motorist in a chain of vehicles imparts an average of a 0.5 second delay in response to the system. In a five automobile chain, the last motorist will observe a brake light on the preceding vehicle no sooner than two full seconds after the situation has manifested. However, if the last motorist in a chain was able to determine whether or not any preceding motorist, other than the immediately preceding motorist, in the chain was braking, then that motorist could ANTICIPATE braking, thus he or she could begin decelerating prior to observing a traditional indication that there was a need to brake.

During adverse driving conditions, a reaction delay is even more undesirable. The above described situations assume that a motorist's perceptions are not impaired. However, in adverse driving conditions such as bad weather, smoke, or dust, etc., a motorist's ability to perceive hazards is significantly reduced. Further, a motorist's ability to observe the condition of a preceding vehicle is also impaired. In addition, road conditions may cause the effective braking distance of a vehicle to be significantly greater than when traveling during favorable road conditions. The ability to anticipate hazardous conditions by receiving information not subject to human reaction delays and not subject to visibility limitations would significantly decrease the occurrences of chain reaction type, multiple vehicle collisions and injuries.

Therefore, there is a need for a distant early warning system for use by motorists and the like to provide information to such operators about actions and conditions occurring in front of them. Information such as whether or not preceding vehicles in a chain of vehicles are decelerating would permit a motorist to prepare to avoid hazardous conditions that could damage property or injure persons.

SUMMARY OF THE INVENTION

The present invention comprises a method, an apparatus, and a system for receiving, perceiving, and transmitting electromagnetic signals through a series of movable, independent units in a substantially linear chain of units. Each unit has a processing unit coupled to an emitter, a detector, means for detecting deceleration of the unit, and means for detecting deceleration of a preceding unit. A simple form of the invention is disclosed wherein the means for detecting deceleration of the unit comprises monitoring an inertial sensor or the unit's deceleration device. The means for detecting deceleration of a preceding unit comprises monitoring a range computing device such as a Doppler device or a direct angle measuring device, or by a passive device such as brake light monitoring device, e.g. a frequency and amplitude sensitive photoelectric detector. A general form is also disclosed wherein a preceding unit encodes the transmitted signal to contain information relating to deceleration of that unit and/or any preceding units from which information relating to deceleration is obtained. To enhance the utility of the apparatus, a display panel is provided for displaying the information contained in the signal. Finally, a complex form is disclosed wherein the encoded signal comprises information relating to the number of units in the chain, the number of decelerating units in the chain, the length of the chain of units, the average velocity of the units, and mass of the chain, as well as other non-operational information such as vehicle identification, motorist information, etc. A more sophisticated display panel is provided to more adequately display the complex information contained within the signal.

The principle object of the invention is to provide all units in a chain of units with information concerning the actions taken by or conditions of preceding units. In the simple form, each unit has a single state binary emitter for transmitting an identifiable signal, and a corresponding detector. The emitter transmits an identifiable signal upon (1) detecting a decrease in relative velocity of a preceding unit, (2) receiving via the detector the identifiable signal, or (3) detecting a decrease in relative velocity of the unit itself. In this manner, all subsequent units in the chain are informed that a preceding unit is decelerating, even if the unit cannot be seen directly or an immediately preceding unit is not decelerating. A feature relating to this form of the invention limits the effective transmission/reception distance of the apparatus to avoid signal overlap.

In the general form, each unit continuously emits a variable state encoded signal. As a first unit approaches a second unit, the detector of the first unit receives the signal. The processing unit then is set to analyze the information encoded in that signal. Four distinct states are provided for: A first transmitted bit indicates that the second unit has or has not detected the deceleration of any unit preceding it; a second transmitted bit indicates that the second unit has or has not begun decelerating. Consequently, there are three distinct pieces of information: Whether the first unit is within range of the second unit; whether any units that may precede the second unit are decelerating; and whether the second unit is decelerating.

In the complex form, each unit continuously emits a signal comprising "packets" of information in the manner of binary transmissions used in digital communications. The use of a standard protocol permits the mass transfer of large volumes of data information. As stated above, such packets may include the number of units in the chain, the number of decelerating units in the chain, the length of the chain of units, the average velocity of the units, and mass of the chain, as well as other non-operational information such as vehicle identification, motorist information, etc. Such information may find use in personal areas or in public areas such as law enforcement.

In a preferred embodiment of the apparatus, a motor vehicle comprises each independent unit. The emitter is mounted so as to face rearwardly and the detector is mounted so as to face forwardly. In this embodiment, the signal is transmitted rearwardly from the vehicle. If a following vehicle is within the range of the emitter, the following unit may receive the signal, process it, and display and forward the signal with or without augmentation, depending upon the conditions. If a following vehicle is equipped with the present apparatus, a system of the invention is formed.

Therefore, a system of a preferred embodiment comprises two or more units equipped with the apparatus which are in data communication with each other. Each unit receives a data encoded signal and may convert the signal to an audio and/or visual display. In addition, each unit may augment the received signal to provide following units with an appropriately updated, data encoded signal.

A method of the invention comprises transmitting a data encoded signal rearwardly to the direction of normal travel by a first unit, receiving the data encoded signal by a second unit, processing the signal into appropriate audio and/or visual form while augmenting the signal with information pertaining to the receiving unit if necessary, and transmitting the combined data information in a direction opposite to the normal direction of travel of the second unit.

Therefore, it is an object of the present invention to provide an apparatus for use in a system having two or more apparatus wherein the status of a first unit is transmitted rearwardly so that it may be received by a second, following unit whereupon the second unit may receive and analyze the data signal and transmit it with possible augmentation concerning the status of the second unit to a third unit, and so on.

It is also an object of the present invention to provide a method, an apparatus, and a system that eliminates delayed human reaction time when reacting to preceding decelerating or stationary units. A benefit of this invention is that by providing each unit in a chain of units with information about units preceding it, an operator of a unit can be better prepared for adverse conditions.

It is another object of the present invention to provide an information conduit commencing from the first unit to the last unit in a chain. By providing such information, any unit in the chain of units can analyze the information contained in the conduit to determine if specific action is required.

It is a further object of the present invention to provide the aforementioned information to a motorist independent of visibility conditions, thereby significantly decreasing a motorist's reliance on visual cues exterior to the unit where such cues may be absent or limited.

A feature of the present invention provides for indicating to an operator of a unit that a chain of units has formed and that the operator's unit is part of that chain; that at least one unit in the chain may be decelerating and/or that an immediately preceding unit is decelerating.

Another feature of the present invention provides for a first unit to have a rearwardly facing light source, preferably a blue light, to indicate to a following unit, possibly not possessing the present invention, that a motorist in a unit preceding the first unit is braking and that caution should be exercised.

Yet another feature of the present invention provides for the transmission and reception of additional information such as the number of units in the chain, the number and identity of units in the chain being braked, the length of the chain of units, the average velocity of the units, and mass of the chain, as well as other non-operational information such as vehicle identification, motorist information, etc. Reception of this information when processed by a microprocessor permits an operator to obtain information about current operating conditions that would otherwise be unavailable to him or her. This information can be further processed by the microprocessor to provide the operator with additional information such as recommended safe following distances.

BRIEF DESCRIPTION OF THE DRAWINGS

FIG. 1 is a simplified illustration of three vehicles that have formed a chain and the status of their display panel lamps and transmitted signal;

FIG. 2 is a simplified illustration of five vehicles that have formed a chain and the status of their display panel lamps and transmitted signal;

DESCRIPTION OF THE PREFERRED EMBODIMENTS

Figure 3:
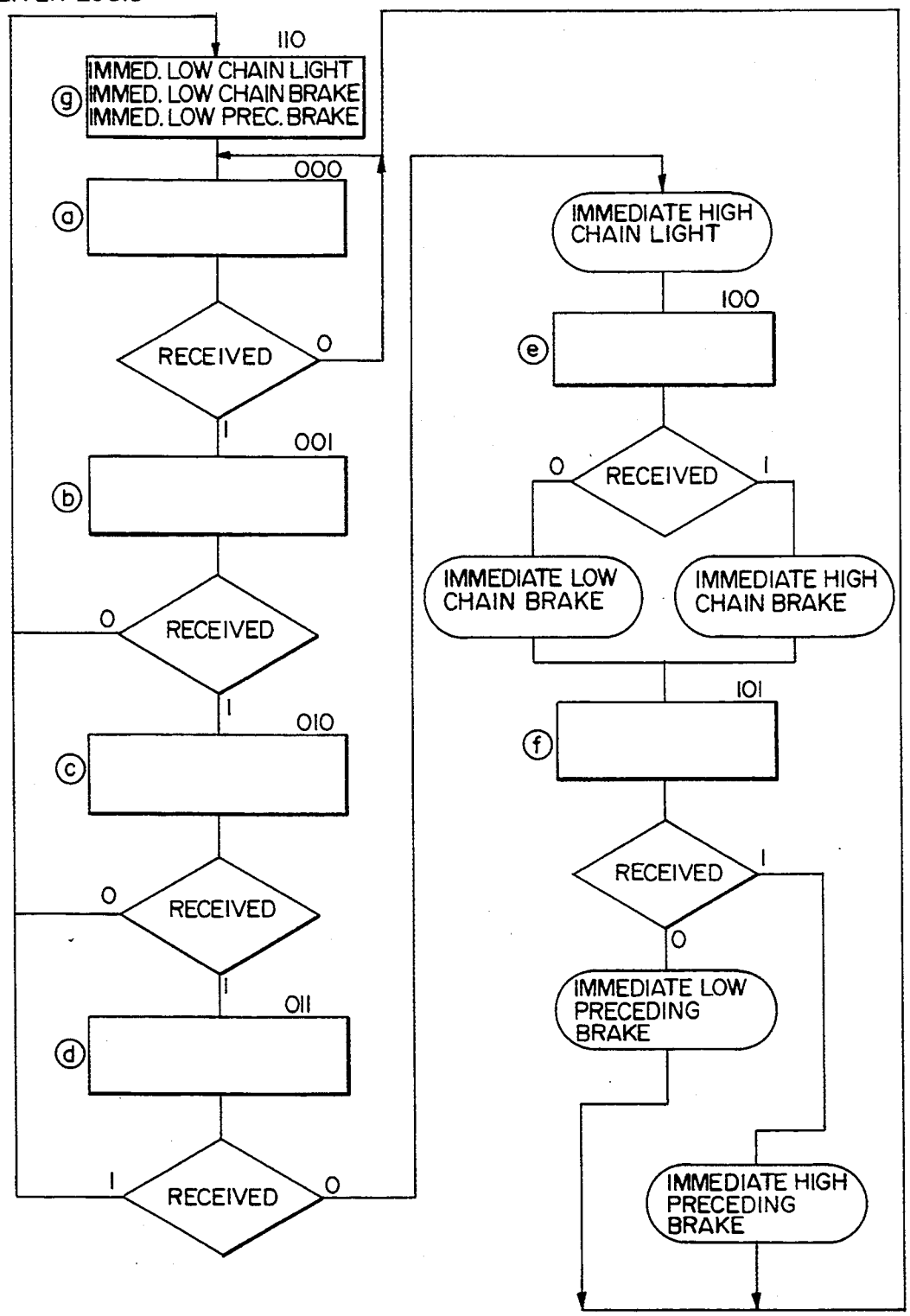
FIG. 3 is an algorithmic state machine logic diagram of the transmitter portion of a preferred embodiment of the invention.

A general embodiment of the present invention can be characterized as a movable unit or vehicle having installed therein an emitter, a detector, a deceleration indicator, a processor, and a panel indicator. In this embodiment, the emitter is constructed so as to produce a highly directional RF signal. Signal frequency is chosen to be very high while output power is chosen to be very low. A high frequency is chosen to enhance the directional nature of the signal so that it will be confined to a relatively small area, and a low power output is chosen so that the effective transmitting distance is approximately six car lengths. Radio frequency signals are chosen as the mode of transmission and reception as they are not subject to degradation during adverse driving conditions as might light waves. The direction of signal emission is substantially rearward in relation to the vehicle's normal direction of travel so that only vehicles in a substantially linear chain will be in communication as opposed to including vehicles adjacent the chain.

The detector is constructed similar to the emitter so as to have greatest sensitivity in a direction substantially forward in relation to the vehicle's normal direction of travel so as to receive RF signals transmitted by emitter equipped vehicles forward of it and within the range of signal transmission. The deceleration indicator provides information relating to a negative change in velocity of the vehicle, and be conveniently associated with the vehicle's braking system. A processing unit is coupled to the emitter, detector, and deceleration indicator, and operates to interpret the incoming signal and provide the vehicle operator with information pertaining to vehicles preceding him or her via the panel indicator and appropriately update the incoming signal for retransmission via the emitter.

In the vehicle chain illustrated in FIG. 1, each panel indicator $30a-c$ (specifically identified as such with the vehicle's letter designation as a suffix, but generically referred to as indicator 30 displays to the motorist of each corresponding vehicle information about his or her vehicle (is she in a chain), about the vehicle directly preceding her (has that motorist applied his brakes), and about the vehicles preceding the followed vehicle (have any brakes been applied by motorist that aren't associated with the immediately preceding vehicle in the chain). The aforementioned conditions are indicated by lamps 34, 36, and 38 on each panel indicator $30a-c$.

"Chain Formed" lamp 34, which may be white in color, informs the motorist if he or she is part of a chain of vehicles, i.e., two or more. "Chain Brake" lamp 36, which may be blue in color, informs a motorist that some motorist preceding the followed vehicle has applied his or her brakes and that it may be necessary to exercise caution, especially if a hazard has not yet been identified. "Brake" lamp 38, which may be red in color, informs the motorist if the brakes of the immediately preceding vehicle have been applied. In both FIGS. 1 and 2, all indicators 30 are in vertical registry so that lamps $34a-h$, $36a-h$, and $38a-h$ are columns. Therefore, to avoid crowding the figures, only the columns are indicates (see indicators $30a$ and $30d$ for column indications).

Also illustrated in FIG. 1 is the state of information transmitted by emitters $12a-c$. Emitters $12a-c$ transmit a data signal comprising in this embodiment a four bit header (1110) which acts as a handshake protocol followed by two bits of data information, and then by a two bit terminator which can signal the end of the series of information or relate to error detection and/or correction, e.g., a Hamming code. Relating to the transmitted two bits of information, the first bit concerns the "Chain Brake" aspect; and the second bit concerns the "Brake" aspect. Each processing unit $20a-c$ (specifically identified as such with the vehicle's letter designation as a suffix, but generally referred to as processing unit 20) controls what data is sent to its respective emitter $12a-c$ from the data signal received from a corresponding detector $10a-c$ and the data obtained from the vehicle itself. The following describes the logic performed by any processing unit 20 when transmitting a data encoded signal.

Transmitted bit 1 is set low (a value of "0") unless one of two conditions are met: Detector 10 receives a valid header (indicating that the receiving vehicle is in a chain) and a high value for bit 1 (indicating that at least one motorist other than the immediately preceding motorist is braking), or detector 10 receives a valid header (indicating that the receiving vehicle is in a chain) and a high value for bit 2 (indicating that the, motorist directly preceding the receiving vehicle is braking). Bit 2 is by default set low unless the vehicle's brakes are activated.

Therefore, the following are representative of the distinct information states that can be transmitted by a vehicle. Also shown is the state of the received signal and the state of a display panel after receipt of the signal. For simplicity, the terminator bits have been omitted and the header bits have been separated by a dash (-) from the data bits.

| Byte received 0000-00: | Header False | Chain Brake Low | Brake Low |
|---|---|---|---|
| Display Panel Status: | White Off | Blue Off | Red Off |
| Byte sent 1110-00: | Header True | Chain Brake Low | Brake Low |

The detector has not received an appropriate header. This indicates either that the motorist is not within the effective transmission/reception range of a preceding vehicle equipped with the invention, or that a preceding vehicle does not have the present invention. Consequently, unless the motorist applies her brakes (thereby meeting the condition for sending bit 2 high), the emitted signal has both bits set low. It should be noted that "0000" is chosen for simplicity. Any combination of bits other than the valid combination, i.e., "1110" can be received, but will not be considered a valid header.

| Byte received 1110-00: | Header True | Chain Brake Low | Brake Low |
|---|---|---|---|
| Display Panel Status: | White On | Blue Off | Red Off |
| Byte sent 1110-00: | Header True | Chain Brake Low | Brake Low |

The detector has received an appropriate header so the motorist is in a chain; no motorist in the chain is braking in front of him; and the motorist is not braking. If the motorist was braking, the transmitted signal would be 1110-01.

| Byte received 1110-01: | Header True | Chain Brake Low | Brake High |
|---|---|---|---|
| Display Panel Status: | White On | Blue Off | Red On |
| Byte sent 1110-10: | Header True | Chain Brake High | Brake Low |

The detector has received an appropriate header so the motorist is in a chain; no motorist preceding the immediately preceding vehicle is braking; the immediately preceding motorist is braking; and the motorist is not yet braking. If the motorist was braking, the transmitted signal would be 1110-11.

| Byte received 1110-10: | Header True | Chain Brake High | Brake Low |
|---|---|---|---|
| Display Panel Status: | White On | Blue On | Red Off |
| Byte sent 1110-10: | Header True | Chain Brake High | Brake Low |

The detector has received an appropriate header so the motorist is in a chain; a motorist in the chain other than the immediately preceding motorist is braking; and the motorist is not braking. If the motorist was braking, the transmitted signal would be 1110-11.

| Byte received 1110-11: | Header True | Chain Brake High | Brake High |
|---|---|---|---|
| Display Panel Status: | White On | Blue On | Red On |
| Byte sent 1110-10: | Header True | Chain Brake High | Brake Low |

The detector has received an appropriate header so the motorist is in a chain; a motorist other than the immediately preceding motorist in the chain is braking; the immediately preceding motorist is braking; and the motorist is not braking. If the motorist was braking, the transmitted signal would be 1110-11.

Figure 4:
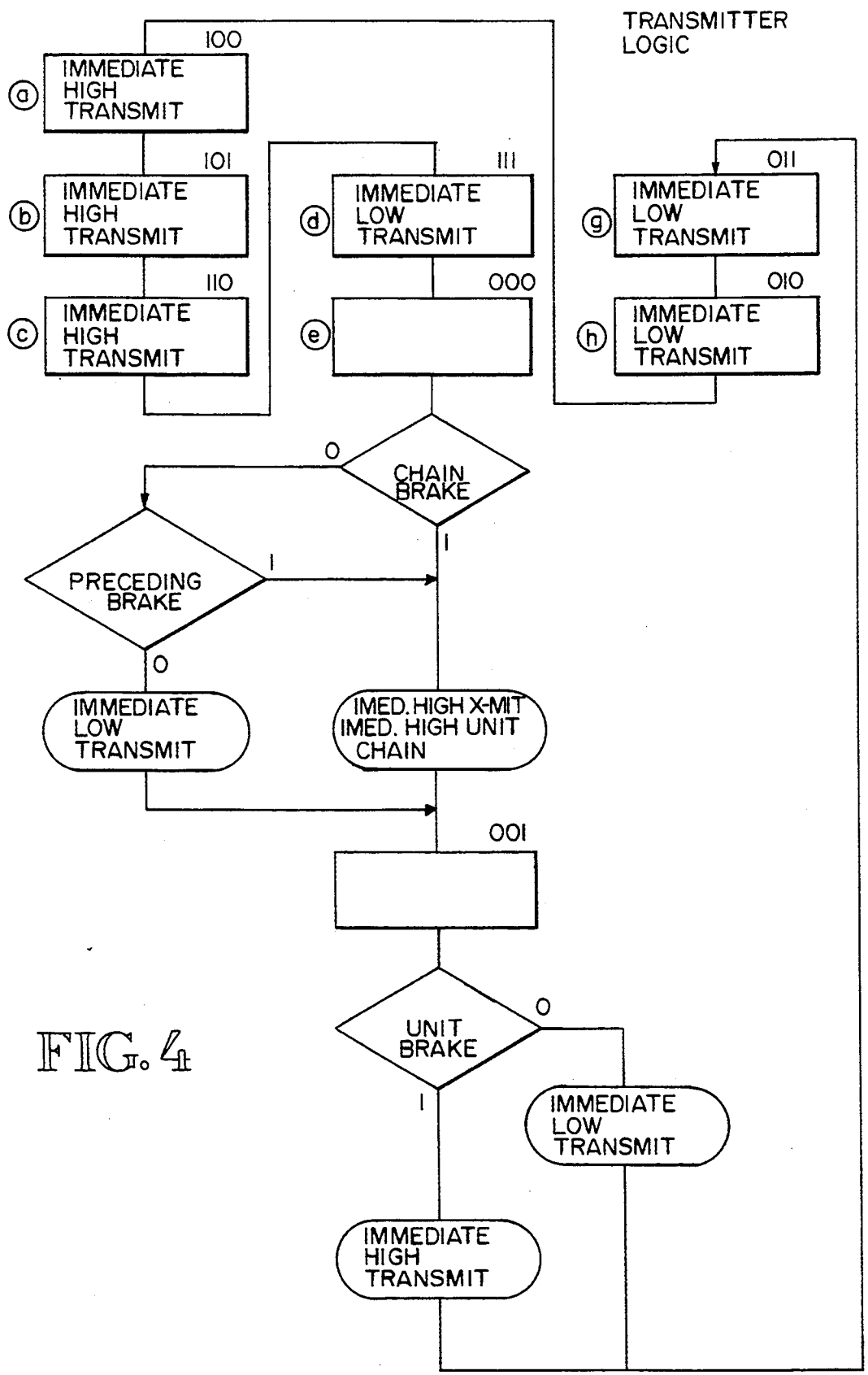
FIG. 4 is an algorithmic state machine logic diagram of the receiver portion of a preferred embodiment of the invention.
Figure 5:
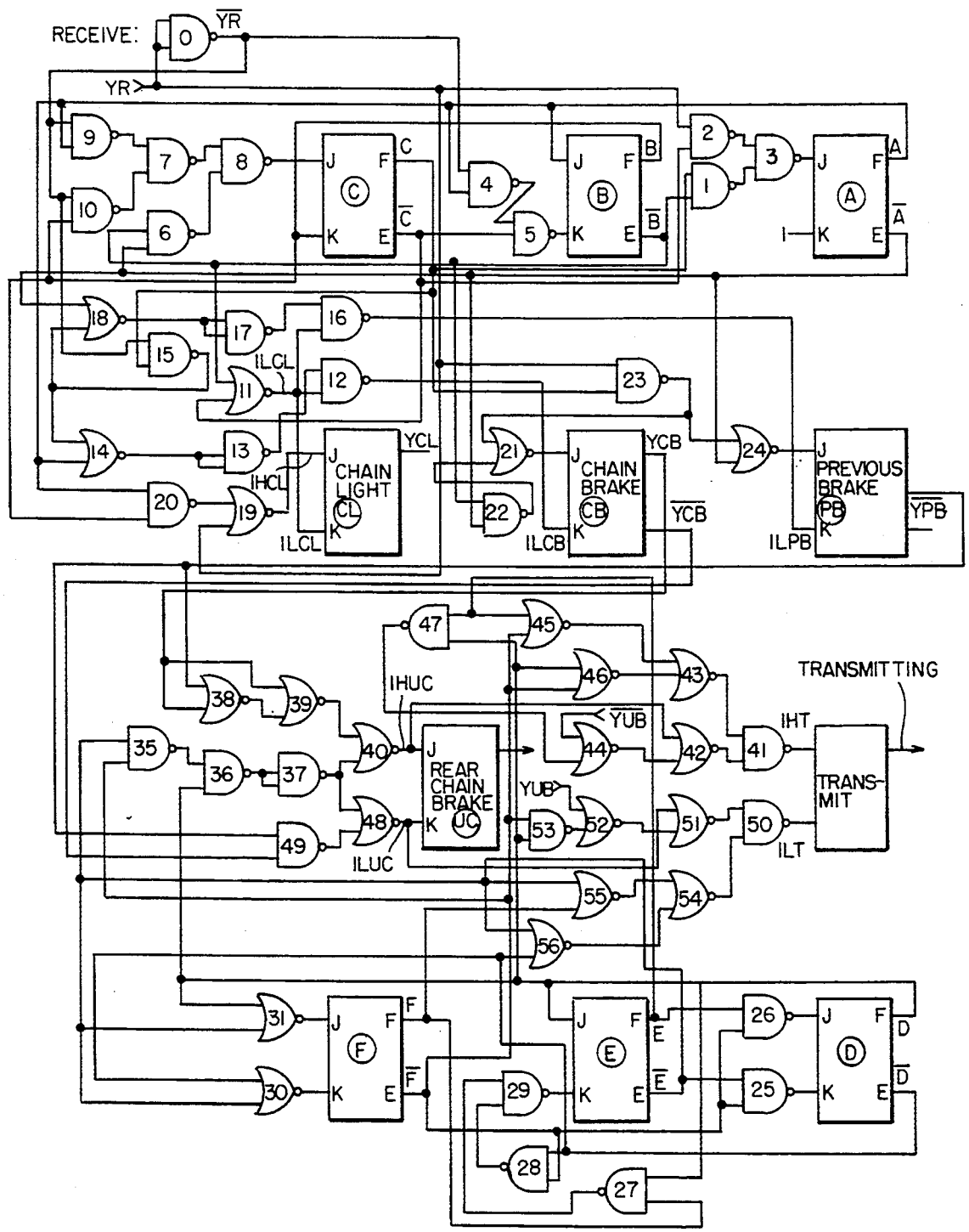
FIG. 5 is a schematic diagram of a processing unit of a preferred embodiment of the invention.

From the foregoing, it can be seen that two distinct functions are performed by the processing unit—display control and emitter control. FIGS. 3 and 4 show the logic performed by the processing unit. The three digit numerals represent distinct states that the processing unit must address. The illustrated logic permits the design and construction of suitable electronics for carrying out functions required by the invention. The algorithmic state machines of FIGS. 3 and 4 can be 'read' using the state assignments shown. The rectangle boxes indicate the current state of the machine with the binary values located on the upper right-hand corner; the diamond boxes indicate the decision process wherein a "1" is true and a "0" is false; the pseudo-elliptical boxes indicate the function to be carried out. FIG. 5 represents a simple design for carrying out the logic using readily available NAND and NOR gates, and flip flops. Flip flops A, B, and C represent the input logic, flip flops CL, CB, and PB represent memory for "Chain Formed," "Chain Brake," and "Brake," and flip flops D, E, and F represent the output logic. Flip flop UC represents a control logic for a rear mounted blue light which will be discussed below.

Turning then to a more complex example, in FIG. 2 a first vehicle D has no vehicles in front of it and therefore cannot receive a valid header. Consequently, display panel 30d has no lamps illuminated. In addition, the motorist of vehicle D is not braking so the transmitted byte is "1110-00".

A second vehicle E receives the signal transmitted by emitter 12d via detector 10e. Upon signal processing by processing unit 20e, display panel 30e of vehicle E is activated and the "Chain Formed" lamp 34 is caused to illuminate. Because received bits 1 and 2 are low, neither the "Chain Brake" lamp 36 nor the "Brake" lamp 38 is caused to illuminate. The motorist of vehicle E, however, has determined that deceleration and/or braking is necessary and has therefore applied her brakes. Consequently, processing unit 20e causes emitter 12e to send bit 2 high, i.e. "01", to indicate that the motorist of this vehicle has applied her brakes.

Vehicle F receives the "1110" header and the "01" data information and processing unit 20f determines that the vehicle is part of a chain because it has received a header and that there are no vehicles ahead of vehicle E that are braking because bit 1 was received low. Furthermore, it has determined that the motorist of vehicle E is braking because bit 2 was received high. Therefore, control panel 30f has illuminated the "Chain Formed" lamp 34 and "Brake" lamp 38. Simultaneously, processing unit 20f sends bit 1 high because one of the conditions necessary for sending bit 1 high has been met: processing unit 20f received a header and bit 2 high. Because the motorist of vehicle F has not applied his brakes, transmitted bit 2 is low.

Vehicle G receives the header "1110" and the "10" data information and processing unit 20g determines that the vehicle is part of a chain because it has received a valid header and that there is at least one motorist ahead of vehicle F that is braking because bit 1 was received high. Furthermore, it has determined that the motorist of vehicle F is not braking because bit 2 was received low. In turn, processing unit 20g causes panel 30g to illuminate the "Chain Formed" lamp 34 and "Chain Brake" lamp 36 and sends bit 1 high because one of the conditions necessary for sending bit 1 high has been met: processing unit 20g has received bit 1 high. And because the motorist of vehicle G has applied her brakes, transmitted bit 2 is sent high.

Finally, vehicle H, the last vehicle in the chain, receives the header "1110" and "11" data information and processing unit 20h determines that the vehicle is part of a chain because it has received a valid header, that there is at least one motorist ahead of the immediately preceding vehicle that is braking, and that the motorist of vehicle G is applying her brakes. Consequently, processing unit 20h causes panel 30h to illuminate all three lamps 34, 36, and 38 and sends bit 1 high and bit 2 low (because the motorist of vehicle H is not yet braking).

It should be noted that this motorist of vehicle H is aware of vehicle E's deceleration as soon as that motorist applies his or her brakes. The motorist of vehicle H does not have to wait for possible action by the motorists of vehicles F or G to apply brakes to know that a potentially hazardous condition exists. In a chain with 10 vehicles where the first vehicle is braking, the present invention will provide the motorist at the end of the chain with this information a full four seconds earlier than by relying a on human reaction chain.

The foregoing discussion was directed primarily towards multiple vehicles moving at high speeds in close proximity to one another. However, the preferred embodiment also provides an enhanced means for detecting a stalled vehicle equipped with the invention if its emergency flashers have been activated. To better illustrate, the following example is provided.

A disabled vehicle is partially on the side of a road. The motorist has temporarily left her vehicle to summon aid. Assume that the roads are slippery and the weather is foggy with visibility less than 50 meters. The motorist has activated her vehicle's emergency flashers thereby causing the processing unit to set transmitted bit 2 high. In addition, activation of the emergency flashers causes the RF amplifier of the invention to increase output power, thereby increasing the distance within which a similarly equipped vehicle may receive the transmitted signal.

At a distance of approximately 100 meters, an approaching vehicle will begin to receive the transmitted header and bit 2 high. Consequently, the display panel of the approaching vehicle will indicate that a chain has formed by illuminating the "Chain Formed" lamp, and will also indicate that the disabled vehicle has been braked by illuminating the "Brake" lamp. Even if there is a vehicle intermediate the disabled vehicle and the motorist, the display panel will illuminate the "Chain Formed" and "Brake" lamps, assuming the intermediate vehicle is also equipped with the invention. Because RF signals do no degrade in situations where visible light does, the approaching motorist knows that he has entered a chain and that brakes or the like are being regularly applied by a vehicle directly ahead, or that a vehicle has its emergency flashers activated. Should another vehicle be following this motorist, their panel will indicate that some motorist ahead is regularly applying his or her brakes, or that someone has activated their emergency flashers and that extreme caution should be exercised. This is a situation wherein the "Chain Brake" indicator is very beneficial—even in a situation where a unit in the "chain" is stationary.

Even if a vehicle's emergency flashers have not been activated, the preferred embodiment provides a means for detecting any vehicle equipped with the invention and whose ignition system is energized when approached from the rear of that vehicle. Because the invention and more particularly the preferred embodiment continuously sends at least the header portion of the transmitted byte, any vehicle equipped with the invention, and approaching from the rear of a transmitting vehicle, will receive the header and indicate to the motorist that his or her vehicle is in a chain. While detection of a valid header indicates that a chain has formed, detection of the valid header when there are no other visual or audible cues to indicate the presence of another vehicle provides the motorist with more, and perhaps critical, information relating to upcoming vehicles that might otherwise be undetected. In adverse weather conditions, this information can be extremely beneficial even without receipt of a "Chain Brake" or "Brake" bit.

To illustrate, say in the above described scenario that the motorist has slid off the road and has become unconscious. His vehicle is stalled and the emergency flashers have not been activated. Visibility has now decreased to less than 5 m. Because his ignition is still energized, his emitter is still transmitting a header signal. An approaching vehicle traveling at an appropriately slow speed for the weather conditions will encounter the transmitted signal at approximately 25 m and consequently the "Chain Formed" lamp will illuminate. The fact that the motorist is now part of a chain in such adverse weather conditions and the fact that the motorist cannot visibly detect the immediately preceding vehicle provides the motorist with enough information so as to indicate that she should exercise extreme caution.

The inventor acknowledges that the present invention is directed towards each vehicle having the invention. However, the inventor has provided a means for motorists following an invention equipped vehicle to benefit from its presence. A rear deck mounted blue light is coupled to the processing unit and is activated by the same mechanism. In this manner, a vehicle following such an equipped vehicle could observe an illumined blue light, thereby indicating to the following motorist that if brake lights are not seen, the observed vehicle is part of a chain and that some motorist of vehicle in the chain has applied his brakes. While the following motorist could not transmit this information to any vehicles following him, the motorist benefits from the information possessed by the observed vehicle.

In another embodiment of the present invention, a more complex system is proposed that permits the signal emanating from emitter 12 to contain information beyond the header plus a two bit signal. For example, the emitted signal can be a multiple word binary signal. In this manner, words of information can be sent in packets.

In this alternative embodiment, information in addition to "Chain Formed", "Chain Brake", and "Brake" would be sent. To illustrate, each vehicle would have an on-board computer that contains information about that vehicle: the number and identity of units in the chain, the number and identity of braking units in the chain, the length of the chain of units, the average velocity of the units, and mass of the chain, as well as other non-operational information such as vehicle identification and motorist information. With this information, a motorist receiving such an information packet could be informed as to whether he or she is driving in a safe manner for the particular chain that he or she is a part.

The inventor has contemplated the ability of the present invention to send and receive such data communication bi-directionally. In this embodiment, the complex form of the invention is utilized in addition to a forwardly directed emitter and a rearwardly directed detector. In this manner, each vehicle comprises a node in the communication network. By utilizing a standard communications protocol such as ISO X.400, each node could communicate to an adjacent node which would then pass this information bi-directionally through the chain of vehicles. The motorist or occupant of any vehicle in the chain could specify what information was to be transmitted and what information was to be received to or from the chain, or to or from any vehicle in the chain. An enhanced display unit such as a CRT will enhance the benefits associated with this embodiment of the invention.

What is claimed is:

1. An apparatus mounted to a first movable unit for receiving a first directional and identifiable electromagnetic signal, or sending a second directional and identifiable electromagnetic signal, said first signal comprising a first portion relating to a change in velocity of any movable unit preceding a second movable unit wherein said second movable unit immediately precedes said first movable unit, and a second portion relating to a change in velocity of said second movable unit wherein said first signal has a predetermined data size, and said second signal comprising a first portion relating to a change in velocity of any movable unit preceding said first movable unit and a second portion relating to a change in velocity of said first movable unit wherein said second signal has a predetermined data size and signal strength, the apparatus comprising:
   a processing unit;
   a detector coupled to said processing unit for receiving said first signal;
   an emitter coupled to said processing unit for transmitting said second signal;
   a deceleration indicator coupled to said processing unit to indicate deceleration of said first movable unit; and
   means for analyzing said first portion and said second portion of said first signal to transmit an appropriately updated and integrated, second directional and identifiable electromagnetic signal as a result of such analysis, said first signal and said second signal being equivalent in data size.

2. The apparatus of claim 1 further comprising an indicating unit for indicating the detection of said first signal to an operator of said first movable unit.

3. The apparatus of claim 1 wherein the signal strength of said second signal is increased upon the activation of a unit's hazard indicators.

4. The apparatus of claim 1 further comprising an automatic acceleration modifying device activated, in part when said processing unit determines that said first signal indicates that a preceding unit is modifying acceleration.

5. The apparatus of claim 1 further comprising an indicating unit for indicating the detection of said first signal, the information contained in said first portion of said first signal, and the information contained in said second portion of said first signal to an operator of said first movable unit.

6. The apparatus of claim 1 wherein each said signal comprises radio frequency waves having a limited effective transmission range.

7. The apparatus of claim 6 wherein said limited effective transmission range is less than or equal to 50 meters.

8. The apparatus of claim 6 wherein said radio frequency waves have a high frequency.

9. The apparatus of claim 1 wherein said emitter is located on said first movable unit so as to transmit said second signal in a direction substantially opposite to the direction of conventional movement and said detector is located on said first movable unit so as to receive said first signal in a direction substantially aligned with the direction of conventional movement.

10. The apparatus of claim 1 wherein said deceleration indicator is activated by said first movable unit's braking mechanism.

11. The apparatus of claim 1 further comprising a visual light source, said light source facing in a direction substantially opposite to the direction of conventional movement of said first movable unit, activatable by said processing unit to indicate deceleration of any movable unit preceding said first movable unit, and clearly identifiable by an operator of a subsequent movable unit.

12. A system for transmitting and receiving information using directional and identifiable electromagnetic signals comprising:
   a first movable unit having a first processing unit;
   a detector coupled to said processing unit for receiving a first signal, said first signal comprising a first portion relating to a change in velocity of any movable unit preceding a second movable unit wherein said second movable unit immediately precedes said first movable unit, and a second portion relating to a change in velocity of said second movable unit wherein said first signal has a predetermined data size;
   an emitter coupled to said first processing unit for transmitting a second signal, said second signal comprising a first portion relating to a change in velocity of any movable unit preceding said first movable unit and a second portion relating to a change in velocity of said first movable unit wherein said second signal has a predetermined data size;
   a deceleration indicator coupled to said first processing unit to indicate deceleration of said first movable unit;
   means for analyzing said first portion and said second portion of said first signal to transmit an appropriately updated and integrated, second directional and identifiable electromagnetic signal as a result of such analysis, said first signal and said second signal being equivalent in data size;

said second movable unit having a second processing unit;

a detector coupled to said second processing unit for receiving said second signal;

an emitter coupled to said second processing unit for transmitting a third signal, said third signal comprising a first portion relating to a change in velocity of any movable unit preceding said second movable unit and a second portion relating to a change in velocity of said second movable unit;

a deceleration indicator coupled to said second processing unit to indicate deceleration of said second movable unit; and means for analyzing said first portion and said second portion of said second signal to transmit an appropriately updated and integrated, third directional and identifiable electromagnetic signal as a result of such analysis, having a data size equivalent to said first and second signal.

13. The system of claim 12 wherein each movable unit further comprises an indicating unit for indicating the detection of a transmitted signal.

14. The system of claim 12 further comprising an indicating unit for indicating the information contained in said first portion of said first signal.

15. The system of claim 12 further comprising an indicating unit for indicating the information contained in said second portion of said first signal.

16. The system of claim 12 wherein each said signal comprises radio frequency waves having a limited effective transmission range.

17. The system of claim 12 where in each said movable unit further has a visual light source, said light source facing in a direction substantially opposite to the direction of conventional movement of each said movable unit, activatable by said processing unit to indicate deceleration of any preceding movable unit, and clearly identifiable by an operator of a subsequent movable unit.

18. A method for establishing a data communication conduit between a plurality of movable vehicles, each said vehicle having:

a processing unit, a detector coupled to said processing unit for receiving a directional and identifiable electromagnetic signal, an emitter coupled to said processing unit for transmitting a directional and identifiable electromagnetic signal, a deceleration indicator coupled to said processing unit to indicate deceleration of the equipped movable unit, and means for analyzing a received signal to determine if any immediately preceding vehicle is decelerating or if a vehicle preceding said immediately preceding vehicle is decelerating comprising the steps of:

a) positioning each vehicle of said plurality of vehicles so as to establish a linear chain of vehicles that are in signal communication with one another;

b) transmitting a signal having a predetermined data size, said transmitted signal comprising information relating to conditions of other vehicles preceding a transmitting vehicle and relating to said transmitting vehicle;

c) receiving said transmitted signal by a following vehicle, and said following vehicle updating and integrating said signal with information relating to said following vehicle and retransmitting said updated and integrated signal wherein said retransmitted signal has a data size equivalent to said received signal; and d) repeating steps b) and c) wherein said following vehicle becomes said transmitting vehicle upon integrating and retransmitting said information contained in said received signal until no more vehicles receive a last transmitted signal.

19. The method of claim 18 further comprising the step of indicating to an operator of at least one vehicle that said immediately preceding vehicle is decelerating and/or that a vehicle preceding said immediately preceding vehicle is decelerating.

20. The method of claim 18 wherein each said vehicle further has means to transmit, receive, and process data communication information in addition to deceleration.

21. The method of claim 20 wherein said data communication information comprises a communication protocol.

22. The method of claim 20 further comprising transmitting said transmitted signal in a direction substantially similar to the direction of vehicular travel and receiving said received signal in a direction substantially opposite to the direction of vehicular travel to permit bi-directional data communication between said plurality of vehicles comprising said data communication conduit.

23. The method of claim 22 wherein at least one said transmitted signal comprises a unique identifier for a transmitting vehicle and wherein said transmitting vehicle can exclusively receive a transmitted signal having said unique identifier incorporated therein.

24. A method for receiving, processing, and transmitting a directional and identifiable electromagnetic signal having a predetermined data size by a first movable unit comprising the steps of:

(a) receiving a first signal, if present, wherein said first signal comprises information relating to a change in velocity of any unit preceding said first unit;

(b) processing said first signal and integrating said first signal with information relating to a change in velocity of said first unit wherein the data size of said first signal is not changed; and (c) transmitting a second signal wherein said second signal comprises velocity information obtained from said first signal as modified in step (b).

25. The method of claim 24 further comprising the step of:

detecting the presence of said first signal and indicating to an operator of said first unit that said first signal has been detected.

26. The method of claim 24 further comprising the step of:

detecting the presence of said first signal and indicating to at least one operator of a movable unit following said first movable unit that any unit preceding said following movable unit has changed velocity.

27. The method of claim 24 further comprising the step of:

detecting the presence of said first signal wherein said first signal comprises a first portion relating to a change in velocity of any unit preceding a second movable unit, said second movable unit immediately preceding said first movable unit, and a second portion relating to a change in velocity of said second movable unit, and wherein said second signal comprises a first portion relating to a change in velocity of any movable unit preceding said first movable unit and a second portion relating to a change in velocity of said first movable unit.

28. The method of claim 27 further comprising the step of:
indicating to an operator of said first movable unit that said first signal has been received.

29. The method of claim 27 further comprising the step of:
indicating to an operator of said first movable unit that a change in velocity of any movable unit preceding said second movable unit has been detected.

30. The method of claim 27 further comprising the step of:
indicating to an operator of said first movable unit that a change in velocity of said second preceding movable unit has been detected.

31. The method of claim 27 further comprising the steps of:
indicating to an operator of said first movable unit that said first signal has been received;
indicating to an operator of said first movable unit that a change in velocity of any movable unit preceding said second movable unit has been detected;
indicating to an operator of said first movable unit that a change in velocity of said second preceding movable unit has been detected.

32. The method of claim 27 further comprising the step of:
detecting the presence of said first signal and indicating to at least one operator of a movable unit following said first movable unit that any unit preceding said first movable unit has changed velocity.

* * * * *